US005480661A

United States Patent [19]
Ellis et al.

[11] Patent Number: 5,480,661
[45] Date of Patent: Jan. 2, 1996

[54] VITAMIN A AND D ADDITIVE FOR MILK PRODUCTS

[75] Inventors: Larry D. Ellis; Philip F. Dressel; Cornelis A. van Deutekom, all of St. Louis County, Mo.

[73] Assignee: Consolidated Flavor Corporation, Bridgeton, Mo.

[21] Appl. No.: 247,309

[22] Filed: May 23, 1994

[51] Int. Cl.⁶ ........................................... A23C 9/158
[52] U.S. Cl. ..................... 426/73; 426/311; 426/417; 426/491; 426/580; 426/581; 426/588; 426/601
[58] Field of Search ............................... 426/73, 580, 581, 426/588, 601, 417, 491, 311

[56] References Cited

U.S. PATENT DOCUMENTS

| | | |
|---|---|---|
| 3,353,961 | 11/1967 | Simon ........................................ 426/651 |
| 3,959,510 | 5/1976 | Felton et al. ............................... 426/590 |
| 4,310,561 | 1/1983 | Buddemeyer et al. . | 
| 4,701,329 | 10/1987 | Nelson et al. . |
| 4,803,087 | 2/1989 | Karinen . |
| 5,342,643 | 8/1994 | Wolf et al. ................................ 426/590 |

*Primary Examiner*—Helen Pratt
*Attorney, Agent, or Firm*—Polster, Lieder, Woodruff & Lucchesi

[57] ABSTRACT

An oil-based vitamin A and Vitamin D preparation having a specific gravity greater than 1.0 used to fortify milk products. The preparation contains vitamin A palmitate, Vitamin $D_3$ resin, ester gum and/or brominated vegetable oil, corn oil, polysorbate 80, and triglycerol monooleate. The preparation is added to the milk product any time during processing and remains dispersed in the milk phase during centrifugal separation. The preparation is concentrated, resists oxidation, and does not require refrigeration.

24 Claims, No Drawings

VITAMIN A AND D ADDITIVE FOR MILK PRODUCTS

BACKGROUND OF THE INVENTION

This invention relates generally to vitamin additives for milk products, more specifically to an improved Vitamin A and D mixture having a specific gravity greater than 1.0 that can be added to a milk product at any stage of preparation.

Generally, commercial dairies fortify milk products with vitamins A and D. For example, prior to packaging the dairy adds vitamin $D_3$ to whole milk and vitamins A and $D_3$ to low fat and skim milk. Currently whole milk is fortified with 400 international units (IU) of vitamin $D_3$ per quart of whole milk. Whole milk does not require the addition of vitamin A since natural Vitamin A palmitate is present in whole milk at levels of approximately 1400 I.U. to 1600 I.U. per quart.

Low fat milk, however, has lower levels of naturally occurring vitamin A. Skim milk has no measurable amounts of natural vitamin A since the natural vitamin A is found in the milkfat phase of whole milk. Therefore, low-fat milk and skim milk are fortified to levels of approximately 2000 I.U. of Vitamin A and 400 I.U. of Vitamin $D_3$ per quart.

There are two general methods known to the art for adding Vitamins A and $D_3$ to milk products. The first method requires the injection of a water soluble emulsion into the milk, while the second method requires injection of an oil soluble vitamin preparation into the milk. Both of these prior art methods have drawbacks which cause extra expense and processing difficulties for the user. Each of these prior art processes will be explained hereinafter.

Water Soluble Emulsion Method

A typical water soluble emulsion of Vitamin A and $D_3$ contains mostly water, Vitamins A and D, propylene glycol (solvent), polysorbate 80 (emulsifying agent) and sodium benzoate (preservative). One commercially used formula, known as Vita-Rite A & D "H"-W Formula #19267, made by Consolidated Flavor Corporation, St. Louis, Mo., has the following formula, by weight:

| | |
|---|---|
| Polysorbate 80 | 25% to 35% |
| Water | 50% to 60% |
| Propylene Glycol | 7% to 17% |
| Vitamin $D_3$ Resin | 0.03% to 0.06% |
| Vitamin A Palmitate (1.75 mu/g) | 4.2% to 5.2% |

The potency of this formula is 80,000 I.U. Vitamin A and 16,000 I.U. Vitamin $D_3$ per milliter and the specific gravity is 1.005. One milliter (ml) of this vitamin product will fortify 40 quarts (approximately 40,000 ml) of milk product, thus the product has a relative potency of approximately 1:40,000. This water-based emulsion may be added to the milk product anywhere during the processing stages prior to packaging.

A water-based formula, such as the above, has certain features which can be improved upon. First, since the formula contains water, it may oxidize over time causing the Vitamin A palmitate to emit strong and offensive flavors into the milk, thus, reducing the shelf life of the product. The product also must be stored in a refrigerator. Finally, the product is not as cost effective as currently used oil-based products, since it is not as concentrated as the oil-based preparations.

Oil-Based Preparation Method

Prior art oil-based Vitamin A and D preparations overcome some of the drawbacks associated with the water-based emulsions as previously described, but also have certain characteristics which can be improved. Prior art oil-based or oil soluble mixtures contain, generally, vegetable oil, glycerol monooleate (emulsifying agent), polysorbate 80 (emulsifying agent), Vitamin A palmitate and Vitamin $D_3$. A representative prior art oil-based vitamin preparation Vita-Rite A & D Formula #19260 made by Consolidated Flavors Corporation, St. Louis, Mo. This product contains by weight:

| | |
|---|---|
| Corn Oil | 37% to 47% |
| Triglycerol Monooleate | 20% to 30% |
| Polysorbate 80 | 15% to 25% |
| Vitamin A Palmitate | 8% to 18% |
| Vitamin $D_3$ Resin | 0.1% to 0.2% |

This oil based preparation has a potency of 200,000 I.U. Vitamin A and 40,000 I.U. Vitamin $D_3$ per milliter. The specific gravity is 0.9483. One milliter (ml) of the oil soluble mixture will fortify 100 quarts (approximately 100,000 ml) of milk, thus the product has a relative potency of approximately 1:100,000.

Since oil soluble preparations are more highly concentrated, they are more economical to use, and less product and labor is required to fortify each milliliter of milk product. The oil-based vitamin product does not contain water, and therefore is not prone to oxidation. The shelf life is somewhat longer than the water-based formula, and oil based products do not require refrigeration.

However, prior art oil-based preparations do have one significant drawback. Since the product is oil soluble, it can not be added to the milk product prior to separation of the cream phase from the milk phase by centrifugal separation. The cream phase has a specific gravity of less than 1.0, as does the vitamin product. The vitamin product, being oil soluble and having a specific gravity of less than 1.0, remains with the cream phase during separation and, therefore, the low fat or skim milk phase of the milk is vitamin deficient after separation.

Thus, oil soluble vitamin preparations must be added to the milk phase after centrifugal separation. This is expensive and time consuming, since the vitamin product must be added in the processing line, on the suction side of the homogenizer. Back pressure in the line can vary, ranging from 0 psi to 80 psi, and accurate control or metering of the vitamin injections into the milk phase is very difficult. Furthermore, under sanitary conditions imposed upon modern dairies, the dairies are reluctant to break into the processing line to inject vitamins. Disturbing the integrity of the processing line can result in the introduction of bacterial contaminants into the milk product.

SUMMARY OF THE INVENTION

It is therefore, a principal object of the present invention to provide a Vitamin A and D additive for milk products which additive has a specific gravity greater than 1.0.

It is another object of the invention to provide a vitamin A and D additive for milk products that can be added to the milk product during processing prior to centrifugal separation.

Still another object of the invention is to provide a vitamin A and D additive for milk products that can be added to the milk product anywhere during the milk processing procedure prior to packaging.

Yet another object of the present invention is to provide a vitamin A and D additive for milk products which requires less mixing or agitation when added to the milk product.

A further object of the present invention is to provide a vitamin A and D additive for milk products which is concentrated to a sufficient level so that it is easy and economical to use.

A still further object of the present invention is to provide a vitamin A and D additive for milk products which does not require refrigeration, contains little or no water, resists oxidation, and has a longer shelf life than presently available products.

In accordance with the invention, briefly stated, a vitamin A and D product to be added to milk products is provided having Vitamin A palmitate, Vitamin $D_3$ resin, ester gum and/or brominated vegetable oil, corn oil, polysorbate 80 and triglycerol monooleate. The product has a specific gravity of greater than 1.0. The product may be added to milk product anywhere during the processing steps including prior to the separation procedure. The product is highly concentrated, has increased shelf life, resists oxidation, and does not require refrigeration.

DESCRIPTION OF THE PREFERRED EMBODIMENT

The vitamin preparation of the present invention consists of a combination of all or some of the following elements:

| | |
|---|---|
| Corn Oil - | an edible fixed oil expressed from corn embryos or germs, having a faint taste and a specific gravity of 0.914–0.921; |
| Polysorbate 80 - | a nonionic surfactant used as an emulsifying agent having a specific gravity of 1.07–1.09; |
| Triglycerol Monooleate - | Mazol ® PG031K (PPG Industries, Inc. Gurnee, Illinois), an emulsifying agent used in food products, approved and regulated under Title 21 C.F.R. 172.854, having a specific gravity of 0.99; |
| Ester gum - | Hercules ® Ester Gum 8BG (Hercules Products, Wilmington, Delaware), a purified glycerol ester of wood resin - beverage grade, used to increase the density of oils which results in improved dispersion and stability; |
| Brominated Vegetable Oils - | any one or more of a group of brominated vegetable oils including brominated soybean oil, brominated canola oil, brominated coconut oil, brominated sunflower oil and brominated cottonseed oil, with brominated soybean oil being preferred; used as an alternative to or with ester gum to increase the density of the product so as to improve dispersion and solubility; The brominated vegetable oil has a specific gravity of about 1.33. |
| Vitamin A Palmitate - | Vitamin A Palmitate, U.S.P., FDC(Hoffmann-LaRoche, Inc., Nutley, New Jersey), is a pure, high potency form of all-trans retinyl palmitate having a potency of 1,600,000 I.U. vitamin A per gram, with a specific gravity of 0.90–0.95; |
| Vitamin $D_3$ Resin - | Vitamin $D_3$, resin (cholecalciferal source 65–75% Cholecalciferal) Vitamin $D_3$ (A.L. Laboratories, Inc., Chicago Heights, Illinois) has 27 million I.U. Vitamin $D_3$ activity per gram and a specific gravity of 0.90. |

EXAMPLE No. 1

One preferred formula for the novel vitamin A and D preparation to be added to milk products is, by weight:

| | | | |
|---|---|---|---|
| Ester gum | about 1% to 3% | preferably | 2.000% |
| Corn Oil | about 1% to 3% | preferably | 2.000% |
| Polysorbate 80 | about 55% to 60% | preferably | 59.5000% |
| Triglycerol Monooleate | about 22% to 26% | preferably | 25.023% |
| Vitamin A palmitate | about 11% to 12% | preferably | 11.330% |
| Vitamin $D_3$ Resin | about 0.1% to 0.2% | preferably | 0.147% |

This formula yields an oil-based product with a specific gravity of greater than 1.0 and the preferred formulation has a specific gravity of about 1.02. The vitamin containing product stays with the non-fat milk solids portion of whole milk during centrifugal separation. This product has an approximate potency of 200,000 International Units Vitamin A and 40,000 International Units of Vitamin D per milliter.

EXAMPLE No. 2

An alternative formulation that is also acceptable uses brominated vegetable oil rather than ester gum to add density to the vitamin preparation. This formula is as follows by weight:

| | | | |
|---|---|---|---|
| Brominated Vegetable Oil | about 8% to 15% | preferably | 10.500% |
| Corn Oil | about 25% to 30% | preferably | 27.828% |
| Polysorbate 80 | about 25% to 30% | preferably | 29.110% |
| Triglycerol Monooleate | about 15% to 25% | preferably | 21.085% |
| Vitamin A Palmitate | about 11% to 12% | preferably | 11.330% |
| Vitamin $D_3$ Resin | about 0.100% to 0.300% | preferably | 0.147% |

The brominated vegetable oil is selected from the group containing brominated soybean oil, brominated canola oil, brominated cottonseed oil, brominated coconut oil and brominated sunflower oil. The preferred oil is brominated soybean oil. The preparation is an oil based mixture with a specific gravity greater than 1.0, that stays with the non-fat milk solid phase of the milk product during centrifugal separation. This product has a relative concentration of 200,000 International Units of Vitamin A and 40,000 International Units of Vitamin $D_3$ per milliliter.

EXAMPLE No. 3

Another novel formulation that is also acceptable includes both brominated vegetable oil and ester gum to add density to the preparation. This formula, is by weight:

| | | | |
|---|---|---|---|
| Brominated Vegetable Oil | about 4% to 10% | preferably | 5.30% |
| Ester Gum | about 10% to 15% | preferably | 13.30% |
| Corn Oil | about 25% to 35% | preferably | 30.26% |
| Polysorbate 80 | about 15% to 20% | preferably | 17.74% |
| Triglycerol Monooleate | about 20% to 25% | prererably | 21.923 |
| Vitamin A Palmitate | about 11% to 12% | preferably | 11.33% |
| Vitamin $D_3$ Resin | about 0.1% to 0.2% | preferably | 0.147% |

The brominated vegetable oil is selected from a group containing brominated soybean oil, brominated canola oil, brominated cottonseed oil, brominated coconut oil, and brominated sunflower oil. The preferred oil is brominated soybean oil. The preparation is an oil based mixture having a specific gravity greater than 1.0 that stays with the non-fat milk phase of the milk during centrifugal separation. This product has a relative concentration of 200,000 International Units of vitamin A and 40,000 International Units of vitamin D per milliliter.

It will be recognized by those familiar with the art that various modifications, can be made to the foregoing formulas without departing from the scope of the appended claims. Therefore, the foregoing description should be viewed as illustrative only and should not be construed in a limiting sense.

We claim:

1. An oil based vitamin A and vitamin D preparation having a specific gravity greater than 1.0 to fortify milk products, which milk products include a fat containing cream portion and a low fat milk portion, said preparation comprising:

vitamin A palmitate, vitamin $D_3$, an emulsifying agent, a vegetable oil, and an amount of a food compatible oil compatible product having a specific gravity greater than 1.0 sufficient to raise the specific gravity of the preparation to a level greater than 1.0 whereby said preparation remains with the low fat milk portion of the milk product when the fat containing cream is separated.

2. The preparation of claim 1 wherein the oil compatible product is an ester gum.

3. The preparation of claim 2 wherein the preparation contains about 1% to about 3% by weight corn oil and about 1% to about 3% by weight ester gum.

4. The preparation of claim 1 wherein the oil compatible product is a brominated vegetable oil.

5. The preparation of claim 4 wherein the brominated vegetable oil is brominated soybean oil.

6. The preparation of claim 4 wherein the preparation contains about 25% to about 30% corn oil and about 8% to about 15% brominated vegetable oil.

7. The preparation of claim 1 wherein the oil compatible product is a mixture of ester gum and brominated vegetable oil.

8. The preparation of claim 7 wherein the brominated vegetable oil is brominated soybean oil.

9. The preparation of claim 8 wherein the preparation contains about 25% to about 35% by weight corn oil, about 10% to about 15% ester gum, and about 4% to about 10% brominated vegetable oil.

10. A vitamin A and D emulsion having a specific gravity greater than 1.0 to be added to a beverage comprising, by weight:

| | |
|---|---|
| a) Ester Gum | 1% to 3% |
| b) Corn Oil | 1% to 3% |
| c) Polysorbate 80 | 55% to 60% |
| d) Triglycerol Monooleate | 22% to 26% |
| e) Vitamin A Palmitate | 11% to 12% |
| f) Vitamin $D_3$ Resins | 0.1% to 0.2% |

11. A vitamin preparation having a specific gravity greater than 1.0 to be added to milk products to fortify the content of Vitamin A and Vitamin D in the milk product comprising, by weight:

| | |
|---|---|
| a) Ester Gum | 1% to 3% |
| b) Corn Oil | 1% to 3% |
| c) Polysorbate 80 | 55% to 60% |
| d) Triglycerol Monooleate | 22% to 26% |
| e) Vitamin A Palmitate | 11% to 12% |
| f) Vitamin $D_3$ Resins | 0.1% to 0.2% |

12. A vitamin A and D preparation having a specific gravity greater than 1.0 to be added to a milk product comprising, by weight:

| | |
|---|---|
| a) Brominated Vegetable Oil | 8% to 15% |
| b) Corn Oil | 25% to 30% |
| c) Polysorbate 80 | 25% to 30% |
| d) Triglycerol Monooleate | 15% to 25% |
| e) Vitamin A Palmitate | 11% to 12% |
| f) Vitamin $D_3$ Resins | 0.1% to 0.3% |

13. The invention of claim 12 wherein said brominated vegetable oil is selected from the group consisting of brominated soybean oil, brominated canola oil, brominated coconut oil, brominated cottonseed oil, and brominated sunflower oil.

14. The preparation of claim 12 wherein said brominated vegetable oil is brominated soybean oil.

15. A vitamin A and D preparation having a specific gravity greater than 1.0 to be added to a milk product comprising, by weight:

| | |
|---|---|
| Ester Gum | 10% to 15% |
| Brominated Vegetable Oil | 4% to 10% |
| Corn Oil | 25% to 35% |
| Polysorbate 80 | 15% to 20% |
| Triglycerol Monooleate | 20% to 25% |
| Vitamin A Palmitate | 11% to 12% |
| Vitamin $D_3$ Resins | 0.1% to 0.2% |

16. The preparation of claim 15 wherein said brominated vegetable oil is selected from the group consisting of brominated soybean oil, brominated canola oil, brominated coconut oil, brominated cottonseed oil and brominated sunflower oil.

17. The preparation of claim 15 wherein said brominated vegetable oil is brominated soybean oil.

18. A method of adding vitamin A and vitamin D to milk products comprising the steps of (a) adding an oil based vitamin A and vitamin D preparation having a specific gravity greater than 1.0 to whole milk which contains a fat containing cream portion and a fluid low-fat milk solids portion prior to separation;

(b) thereafter separating the cream portion from the fluid low-fat milk solids portion, and (c) recovering a fluid low-fat milk solids containing portion with the added vitamin A and vitamin D therein.

19. The method of claim 18 wherein the oil based vitamin A and vitamin D preparation contains vitamin A palmitate, vitamin $D_3$, an emulsifying agent, a vegetable oil, and an amount of a food compatible oil compatible product having a specific gravity greater than 1.0 sufficient to raise the specific gravity of the preparation to a level greater than 1.0.

20. The method of claim 19 wherein the oil compatible product is an ester gum.

21. The method of claim 19 wherein the oil compatible product is a brominated vegetable oil.

22. The method of claim 21 wherein the brominated vegetable oil is brominated soybean oil.

23. The method of claim 19 wherein the oil compatible product is a mixture of ester gum and brominated vegetable oil.

24. The method of claim 23 wherein the brominated vegetable oil is brominated soybean oil.

* * * * *